Nov. 19, 1935.  C. D. TOUSLEY  2,021,436
SMOKER'S APPLIANCE
Filed May 9, 1935
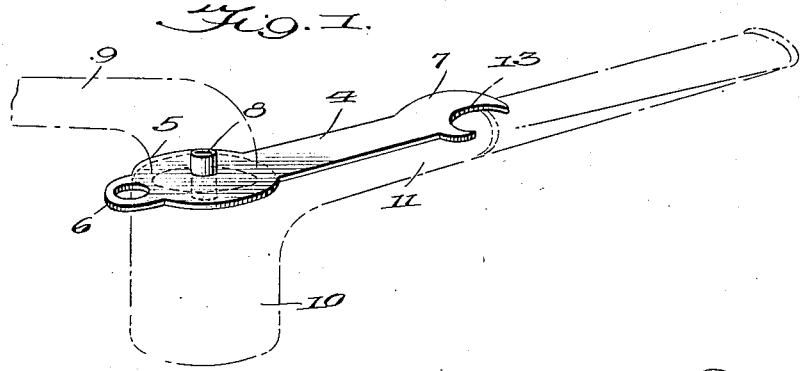
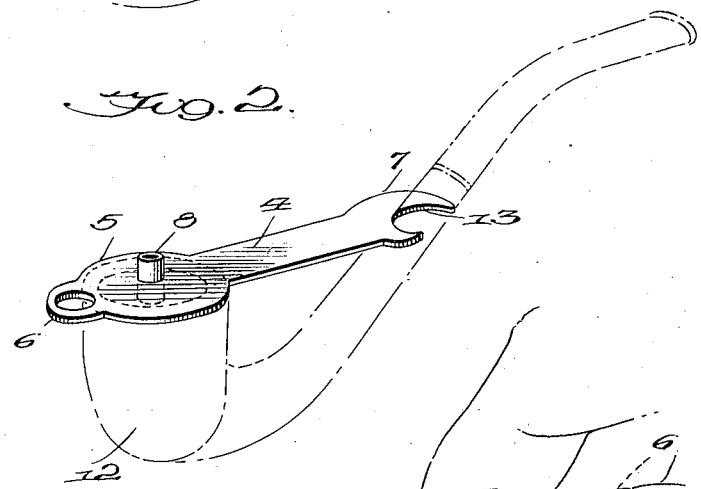
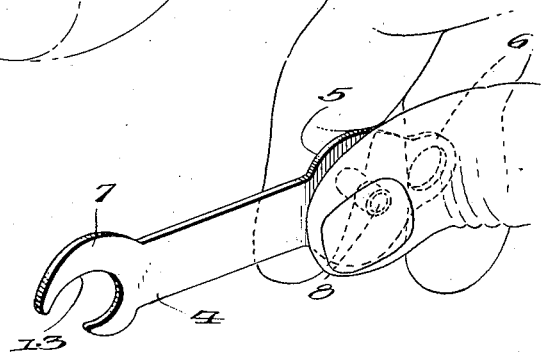
CHARLES DOUGLAS TOUSLEY
Inventor
By Milo B. Stevens & Co.
Attorney

Patented Nov. 19, 1935

2,021,436

UNITED STATES PATENT OFFICE 2,021,436

SMOKER'S APPLIANCE

Charles Douglas Tousley, Le Sueur, Minn., assignor of one-half to John B. Ries, Shakopee, Minn.

Application May 9, 1935, Serial No. 20,676

4 Claims. (Cl. 131—13)

This invention relates to smokers' appliances and has as an object the provision of a combination implement that is adaptable for use as a pipe cleaner implement or as a bottle opener.

Other objects will be apparent from the description.

In the drawing:—

Figure 1 is a perspective view illustrating the service association of the appliance with a pipe of the underslung type in cooperation with a tire chuck, when the appliance is used as a pipe cleaning instrument, by which the pipe may be blown clean.

Figure 2 is a perspective view illustrating the service association of the appliance as a cleaner implement for blowing pipes of the curved stem type.

Figure 3 is a perspective view illustrating the manner by which the appliance is adapted for use as a bottle opener.

A convenient manner of cleaning a pipe is to blow the same clean from the bowl through the stem, utilizing the air pressure from a tire chuck available at any service station. Devices have been developed for this purpose but have proved objectionable in that they are hard to handle; it being necessary to operate the tire chuck with one hand and to use the other hand to hold a covering device over the pipe bowl for engaging the tire chuck. This operation requires that the pipe be placed upon the ground or some other suitable support and it is not an easy matter to maintain a proper position of the pipe under these circumstances. The appliance of my invention provides an easy means by which a pipe may be blown clean, as the appliance may be held in one hand together with the pipe as a unit for operative association with a tire chuck which can be held in the other hand. This eliminates the necessity for positioning the pipe upon the ground or supporting surface.

Preferably the device comprises a metal stamping formed as a narrow flat shank 4 provided adjacent one end with a circular head 5 enlarged in the plane of the shank and having a diameter sufficient to overlie the mouth of a pipe bowl and provide a complete coverage therefor. Diametrically opposite its connection with the shank 4, the head is provided with an apertured ear 6 in the plane of the shank and head, by which the appliance may be conveniently carried upon a key ring. The ear 6 extends beyond the enlarged head in the axis of the shank.

At its opposite end the shank 4 is provided with a claw 7 in the plane of the shank, which claw is proportioned to engage a bottle cap when the appliance is used as a bottle opener.

The head 5 has rigidly associated therewith an axially disposed hollow tube 8 that extends through the head and projects laterally a short distance from the opposite side faces thereof. This tube 8 is of a size sufficient to engage within a tire chuck, generally indicated as at 9 in dotted lines in Figure 1, when the chuck is placed thereover.

When the appliance is used as a pipe blower implement the flat head 5 is placed over the pipe bowl for complete coverage thereof with the shank 4 extended rearwardly substantially parallel to the stem of the pipe, whereby both the stem and the shank may be grasped in one hand so that the parts are properly associated. The tire chuck is then applied over the head 5 whereupon the tube 8 acts in the manner of an ordinary tire valve to operate the chuck whereupon air under pressure is discharged through the tube 8 into the pipe bowl for blowing the pipe clean, the dirt and foreign material being forced out through the stem of the pipe.

In Figure 1 the appliance is shown as associated with a pipe of well known construction, such as the underslung type, wherein it will be noted that the head 5 covers the bowl 10 with the shank 4 lying rearwardly along and over the flat stem 11. The shank and stem may be grasped between the thumb and forefinger so that the parts will be held rigidly in position for association with the tire chuck 9 which is moved down into operative position by the other hand without requiring the placing of the pipe upon the ground or any supporting surface.

In the case of curved stem pipes such as shown in Figure 2, the head 5 is placed over the pipe bowl 12 with the shank 4 extended rearwardly and the claw 7 is moved against the stem so that, in the majority of instances, the stem will be nested within the bight 13 of the claw whereby the appliance and the pipe stem may be firmly clamped together in one hand leaving the other hand free for manipulating the tire chuck. Even in those instances wherein the angle of the pipe stem is such that it may not engage within the bight 13, the shank may be moved so that an edge of the claw engages against the pipe stem so that the parts may be clamped together in one hand.

In my appliance not only does the claw 7 function as a means for engaging a pipe stem when the appliance is used as a pipe blowing implement, but when the appliance is employed in the conventional manner as a bottle cap opener the laterally projecting portions of the tube 8 provide a grip centering means engageable by the thumb and index finger, as shown in Figure 3, which serves effectively to prevent angling or slipping of the shank and head in the hand of a person using the appliance. Practically everyone who has used the ordinary flat claw type of bottle opener is familiar with the objectionable slipping and angling of the device and also with the fact that as a general rule considerable manipulation is required before the claw properly engages the bottle cap. In the use of my appliance the opposite lateral projections of the tube 8 serve as a gripping means by which the shank may be centered into proper position so that it can be engaged with a bottle cap without slipping or slanting. Furthermore, the projections of the tube 8 in conjunction with the enlarged head 5 provide an effective grip for manipulating the appliance when used as a bottle cap remover.

I claim:—

1. As an article of manufacture an implement comprising a shank providing a handle, a head adjacent one end thereof and laterally enlarged in the plane of the shank, a hollow tube extending axially through said head, and a claw formed at the other end of said shank, said head, shank and claw being integral and in the same plane and being adapted to aid in maintaining the implement in operative relation on a pipe.

2. As an article of manufacture an implement comprising a flat shank providing a handle, a substantially circular enlargement formed on said shank adjacent one end and in the plane thereof to overlie and close the mouth of a pipe bowl, a hollow tube extending axially through said enlargement for operative engagement with a tire chuck, and the other end of said shank being provided with a claw adapted for engagement over a pipe stem.

3. As an article of manufacture an implement comprising a flat shank providing a handle portion, a claw provided at one end of said handle portion and adapted to engage a pipe stem, a head adjacent the other end of said shank and laterally enlarged in the plane thereof, and tubular projections extending laterally from opposite side faces of said head axially thereof.

4. A smoker's appliance comprising a flat shank adapted to overlie a pipe stem substantially parallel thereto, a claw formed on one end of said shank for nesting engagement over a pipe stem, a pipe bowl cover formed at the other end of said shank for closing the mouth of a pipe bowl when applied thereover, and means in said cover for cooperative engagement with a tire chuck to admit air under pressure to the pipe bowl.

CHARLES DOUGLAS TOUSLEY.